April 1, 1924.

F. H. HOGE 1,488,985

CHANGE SPEED DEVICE AND THE LIKE

Filed Jan. 18, 1923    5 Sheets-Sheet 1

Inventor:
Frederick H. Hoge.
by Denning & Denning Attys.

April 1, 1924.

F. H. HOGE 1,488,985

CHANGE SPEED DEVICE AND THE LIKE

Filed Jan. 18, 1923    5 Sheets-Sheet 2

Inventor:
Frederick H. Hoge.
by
Attys

April 1, 1924.
F. H. HOGE
1,488,985
CHANGE SPEED DEVICE AND THE LIKE
Filed Jan. 18, 1923    5 Sheets-Sheet 3
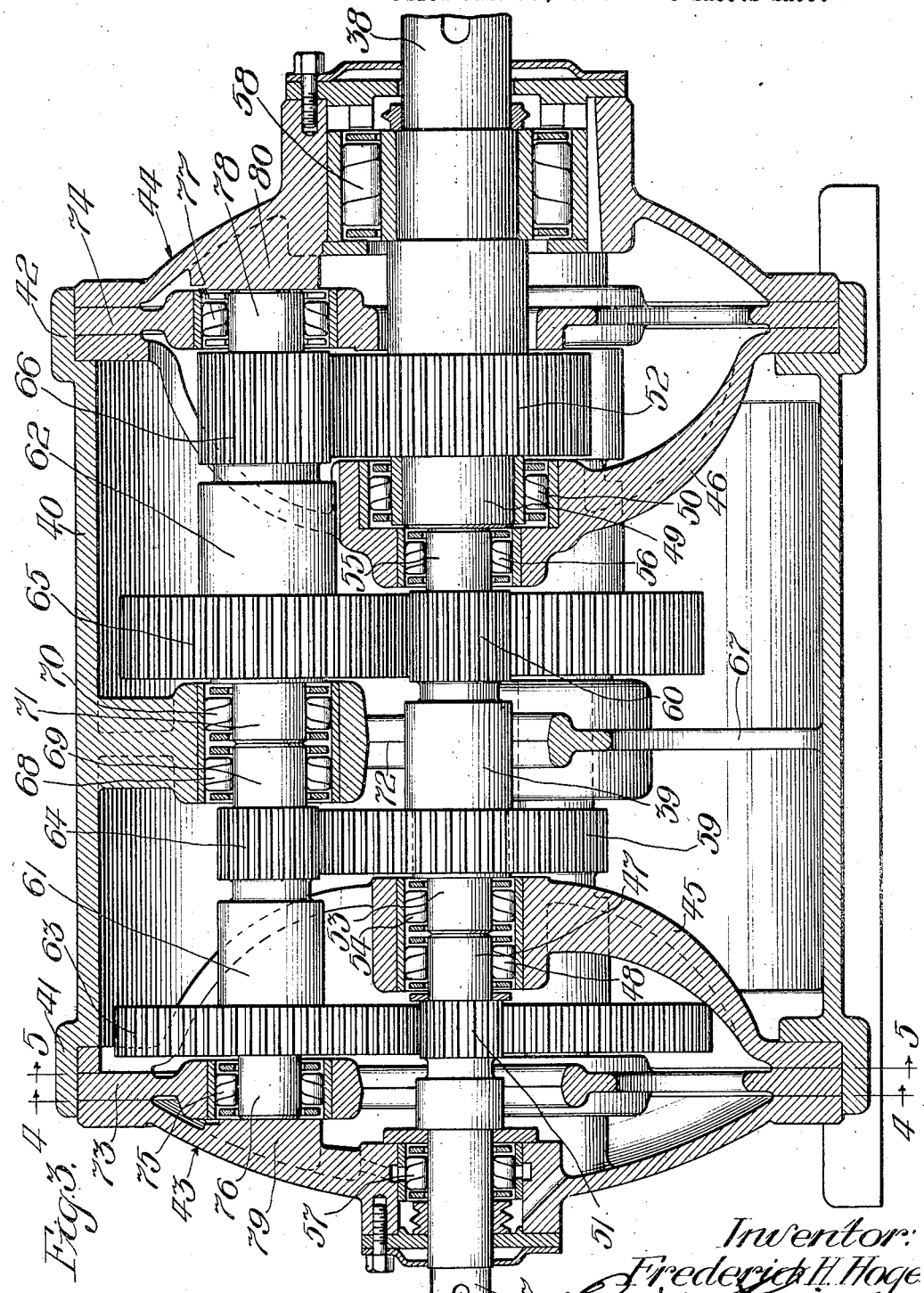

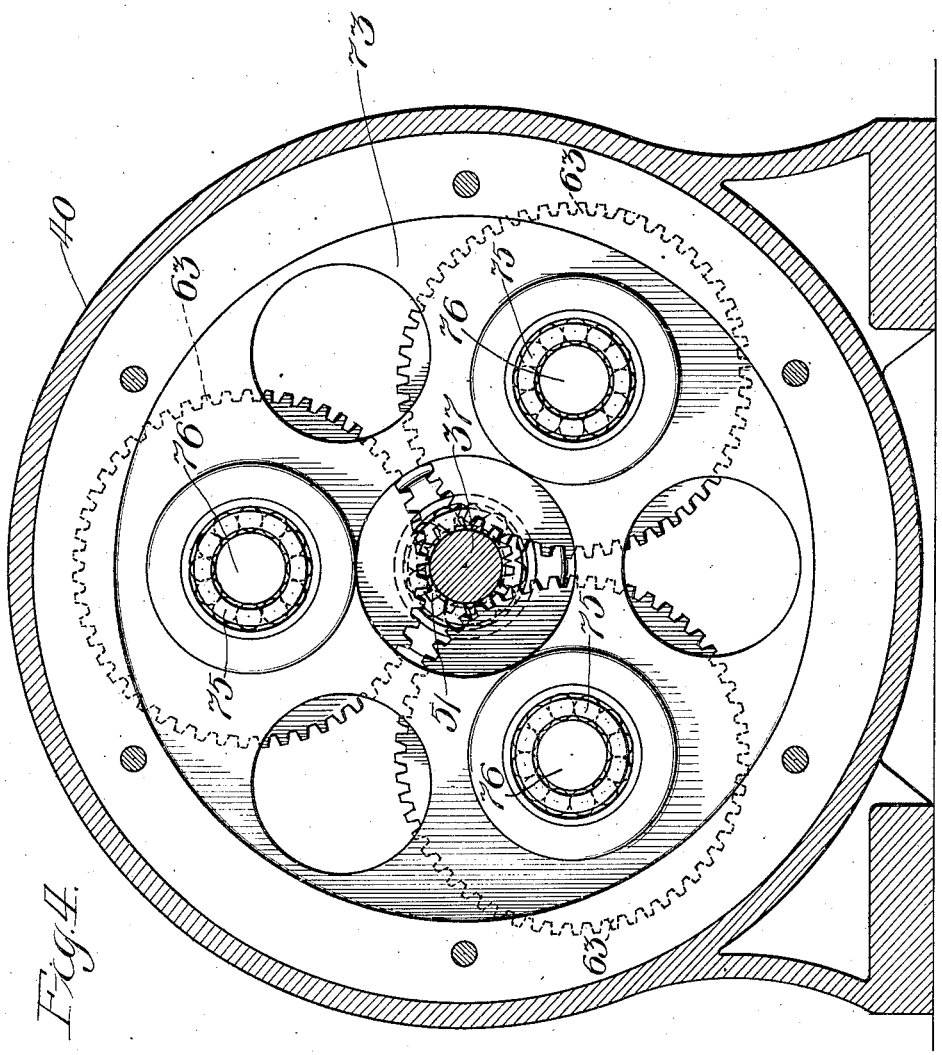

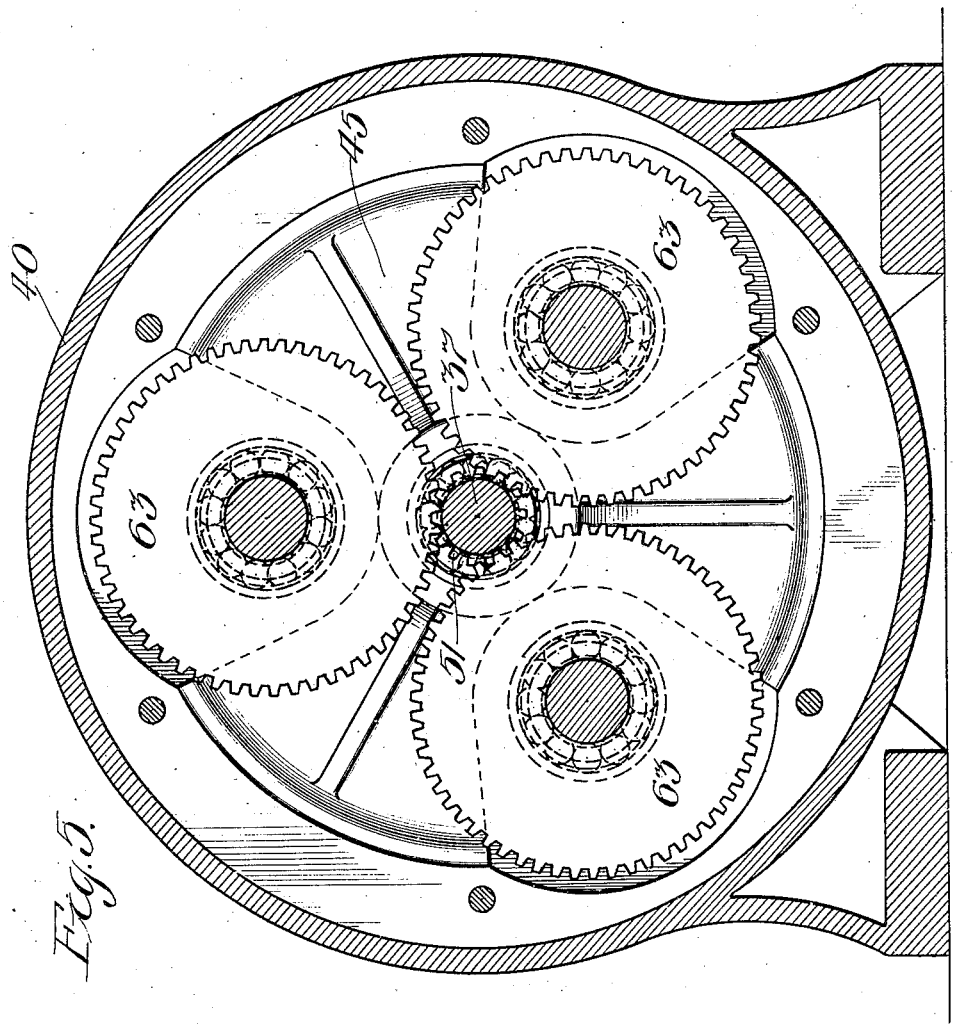

Patented Apr. 1, 1924.

1,488,985

UNITED STATES PATENT OFFICE.

FREDERICK H. HOGE, OF CHICAGO, ILLINOIS, ASSIGNOR TO W. A. JONES FOUNDRY & MACHINE COMPANY, OF CHICAGO, ILLINOIS, A CORPORATION OF ILLINOIS.

CHANGE-SPEED DEVICE AND THE LIKE.

Application filed January 18, 1923. Serial No. 613,335.

*To all whom it may concern:*

Be it known that I, FREDERICK H. HOGE, a citizen of the United States, residing at Chicago, in the county of Cook and State of Illinois, have invented certain new and useful Improvements in Change-Speed Devices and the like, of which the following is a specification.

This invention has to do with certain improvements in gear speed change devices such as are used for either decreasing or increasing the speed of rotation with corresponding increase or decrease of torque.

The invention has reference particularly to improvements in the bearing arrangements by which the shafts and gears are journaled within the casing. In this connection, it is an object to provide a construction in which the bearings for the back gears and shafts may be carried independently of the casing heads, so that the support of these back gear bearings and shafts and the strains which come upon them may be very easily taken care of and without the necessity of making special provision for the same within the heads of the casing proper.

In connection with this feature of the invention, I have provided for the back gears and shafts a series of journal webs or plates independent of the heads of the casing itself. These webs may be readily supported by and centered within the barrel or drum portion of the casing and enclosed and held in place by the casing head proper.

Another feature of the invention consists in the provision of a construction and arrangement such that the bearings for the different shafts are independent of each other within those cases in which said shafts happen to be in alignment with each other. This will make it unnecessary to secure exact alignment of the shafts, and in case either shaft should be slightly out of alignment, this fact will not interfere with a proper and perfect running of the other parts.

Other features of the invention will appear from a detailed description of the same, which consists in the features of construction and combinations of parts hereinafter described and claimed.

In the drawings:

Fig. 3 shows a longitudinal section corresponding to Fig. 1 with the exception that provision is made therein for change of speed by the use of three sets of back gears and shafts in tandem;

Fig. 4 shows a section taken on the line 4—4 of Fig. 3, looking in the direction of the arrows; and Fig. 5 shows a section taken on the line 5—5 of Fig. 3, looking in the direction of the arrows.

Figure 1:
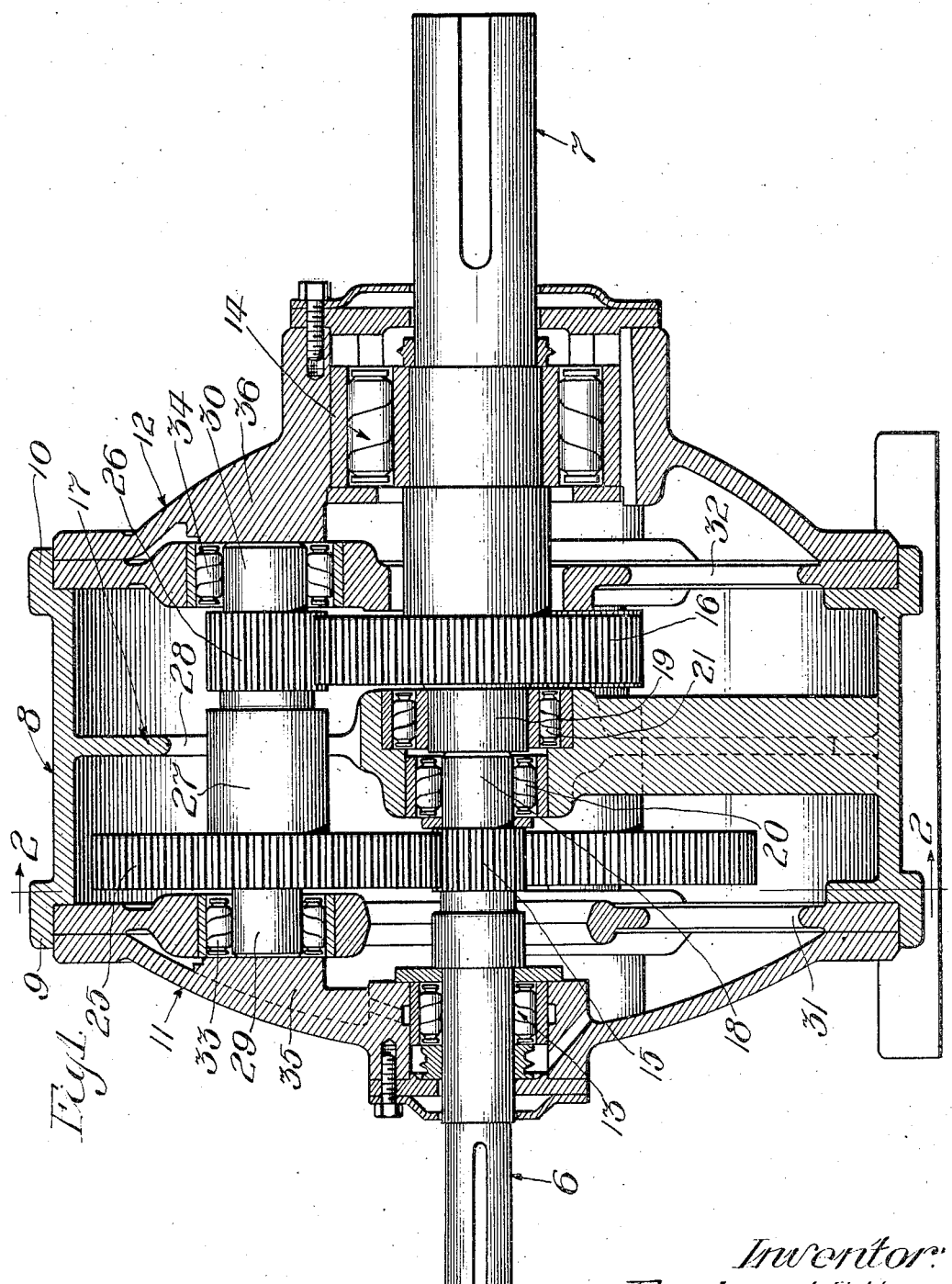
Figure 1 shows a longitudinal section through a gear speed reducing machine embodying the features of the present invention and within which machine provision is made for change of speed by the use of only a single set of back gears and shafts.
Figure 2:
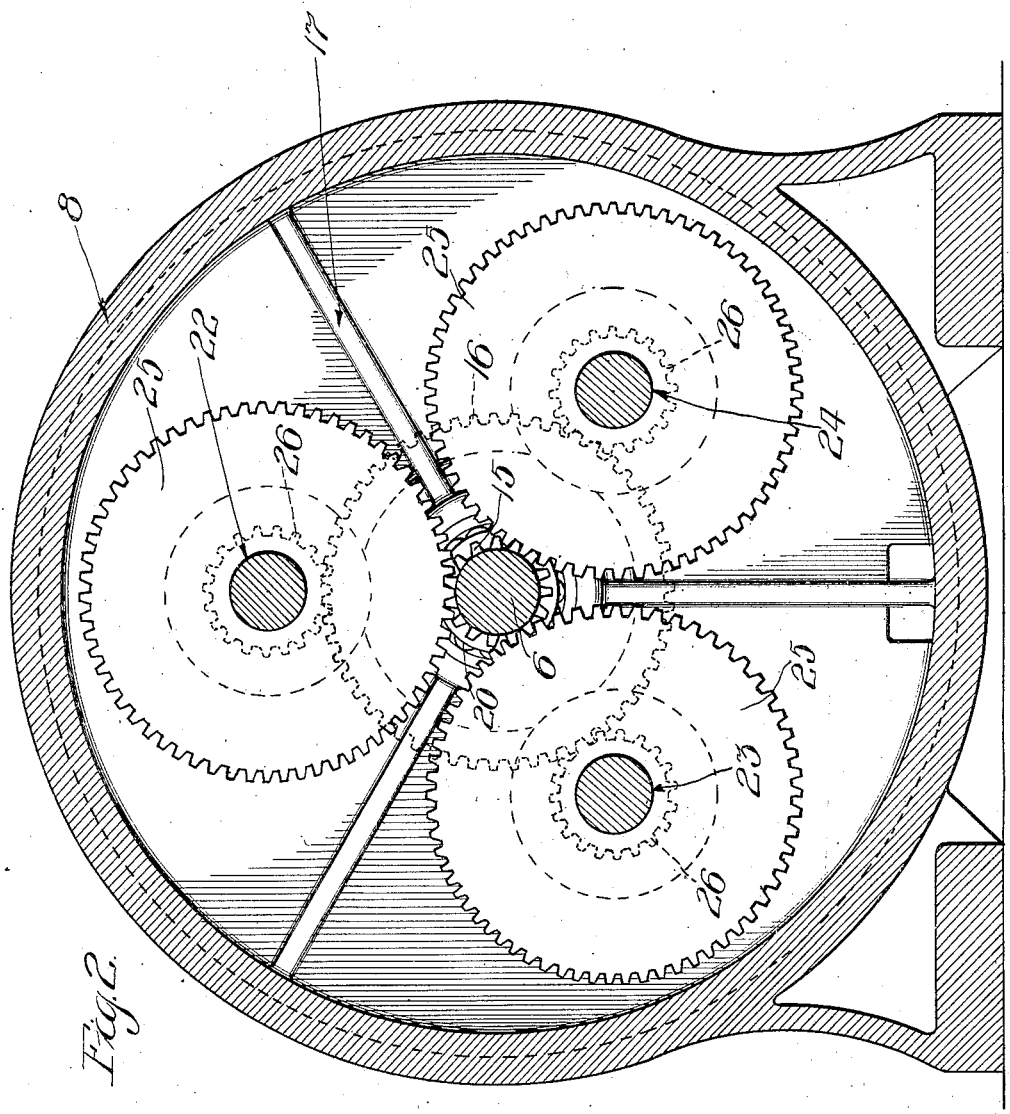
Fig. 2 shows a section taken on the line 2—2 of Fig. 1, looking in the direction of the arrows.

Considering first the construction shown in Figs. 1 and 2, the same includes the high and low speed shafts 6 and 7 respectively. These shafts are placed in alignment with each other and are illustrated as being of different sizes corresponding to the different amounts of torque which they carry.

The casing includes a central or barrel section 8 having the end flanges 9 and 10 at the high and low speed ends respectively. There are also provided the high speed end head 11 and the low speed end head 12 which set snugly into the flanges 9 and 10 respectively so as to close the ends of the casing.

The high speed shaft 6 passes through the head 11 within which it is journaled by a roller bearing 13, and the low speed shaft 7 passes through the head 12 within which it is journaled by a roller bearing 14. A pinion 15 is located on the inner end of the high speed shaft and a gear 16 on the inner end of the low speed shaft. There is also a central web 17 extending transversely of the central portion of the drum 8, and the extreme inner ends 18 and 19 of the two shafts are journaled in this web by the use of suitable bearings such as the roller bearings 20 and 21 respectively. It will be observed that the alignment of each shaft is thus entirely independent of the other and the size and character of the bearings for the two shafts can be regulated according to their independent needs.

Located within the casing is a series of one or more back gear sets which work between the pinion 15 and gear 16. Three of these back gear sets numbered 22, 23 and 24 are illustrated, located equi-distantly around the shafts so as to produce a perfectly balanced operation and to produce a perfect balance of thrust on the various bearings.

Each of these back gear sets includes a gear 25 meshing with the pinion 15 and a pinion 26 meshing with the gear 16. The gear and pinion 25 and 26 are located on a short shaft 27 which reaches through an opening 28 of the web 17. The ends 29 and 30 of each of these shafts 27 are journaled in appropriate manner. In order to support these journals entirely separate from the casing heads 11 and 12, I have provided the bearing plates 31 and 32 respectively, which are located within the casing flanges 9 and 10 and adjacent to the casing heads 11 and 12. The bearing plate 31 carries a roller bearing 33 for each of the shaft ends 29, and the plate 32 carries a roller bearing 34 for each of the shaft ends 30. If desired, the casing heads 11 and 12 may be provided with abutments 35 and 36 respectively in alignment with the various back gear shafts 27 so as to prevent undesirable end play in said shafts and the gears and pinions carried by them.

In the construction shown in Figs. 3, 4 and 5, the high and low speed shafts 37 and 38 respectively are placed in alignment with each other, but they are separated by an intermediate back gear shaft 39 with which they are also in alignment. The central portion 40 of the casing is provided with the end flanges 41 and 42 similar to the arrangement previously explained, and the high speed and low speed casing heads 43 and 44 are seated within the flanges 41 and 42 as in the previously explained construction.

In the present case a dish shaped bearing plate 45 is seated in the high speed end flange 41, and another dish shaped bearing plate 46 is seated in the low speed end flange 42. Each of these bearing plates is bulged inwardly far enough to reach substantially beyond the inner end of the corresponding shaft 37 or 38 as the case may be so as to be able to support said shaft with a suitable bearing. For example, the high speed shaft 37 has its inner end 47 journaled in the plate 45 by the use of the roller bearing 48 and the inner end 49 of the low speed shaft 38 has its inner end journaled in the plate 46 by the use of the roller bearing 50.

The high speed shaft 37 is provided with the pinion 51 at its inner end and the low speed shaft 38 is provided with the gear 52 at its inner end.

The intermediate shaft 39 has its high speed end 53 journaled in the plate 45 by the use of the roller bearing 54 and has its low speed end 55 journaled in the plate 46 by the use of the roller bearing 56. Consequently, the alignment of the high speed and low speed shafts and of the intermediate shaft 39 are independent of each other, and the bearings which support these shafts may be adopted with a view to the conditions under which they operate.

The high speed shaft has its outer end journaled in the casing head 43 by the use of the roller bearing 57, and the low speed shaft has its outer end journaled in the casing head 44 by the use of the roller bearing 58.

The intermediate shaft 39 carries a gear 59 at its high speed end and a pinion 60 at its low speed end. Between the high speed pinion 51 and the gear 59 is located one or more back shafts 61 and between the pinion 60 and the gear 52 is located one or more back shafts 62. Each of the shafts 61 carries a gear 63 meshing with the high speed pinion 51 and also a pinion 64 meshing with the gear 59; and each of the shafts 62 carries a gear 65 meshing with the pinion 60 and a pinion 66 meshing with the gear 52. It is preferred that there be provided three each of the shafts 61 and 62 together with their gears and pinions and located equi-distantly around the central axis of the machine for reasons similar to those already explained in connection with the construction shown in Figs. 1 and 2.

Extending transversely across the central portion of the barrel casing 40 is a flange or web 67 which carries a roller bearing 68 for the inner end 69 of each of the shafts 61, and also carries a roller bearing 70 for the inner end 71 of each of the shafts 62. The central portion of the flange or web 67 is open as at 72 to freely pass the intermediate shaft 39.

A bearing plate 73 is set into the flange 41 at the high speed end of the machine and another bearing plate 74 is set into the flange 42 at the low speed end of the machine. The bearing plate 73 carries a roller bearing 75 for the outer end 76 of each of the shafts 61 and the bearing plate 74 carries a roller bearing 77 for the outer end 78 of each of the shafts 62. The high speed and low speed end heads 43 and 44 respectively are also provided with lugs or abutments 79 and 80 in alignment with the various shafts for reasons similar to those already explained with respect to the construction shown in Figs. 1 and 2.

While I have herein shown and described only certain embodiments of the features of my present invention, still I do not limit myself to the same except as I may do so in the claims. For example, while I have herein illustrated in the drawings constructions using spur gears, nevertheless, I contemplate the use of any other suitable forms of gears such as herring bone, helical, etc.

I claim:

1. A speed change device of the character specified comprising in combination a cylindrical casing having a circular flange at each end, a high speed end casing head seated into the flange at one end, a low speed end casing head seated into the flange at the other end, a high speed shaft extending centrally through the high speed end casing head and journaled therein, a low speed shaft extending centrally through the low speed end casing head and journaled therein in alignment with the high speed shaft, independent journals for the inner ends of said shafts supported by the casing, a pinion on the inner end of the high speed shaft, a gear on the inner end of the low speed shaft, a plurality of back gear shafts and gears within the casing lying parallel to the high speed and low speed shafts, gear and pinion connections on said back gear shafts and in conjunction with the high speed shaft pinion and the low speed shaft gear aforesaid, bearing plates seated within the casing end heads, journals in said plates for the back gear shafts aforesaid, whereby the back gear shafts are supported and journaled independently of the casing end heads, and abutments on the inner faces of the casing end heads in alignment with the back gear shafts and serving to limit end movement thereof, substantially as described.

2. A speed change device of the character specified comprising in combination a cylindrical casing having a circular flange at each end, a high speed end casing head seated into the flange at one end, a low speed end casing head seated into the flange at the other end, a high speed shaft extending through the high speed end casing head and journaled therein, a low speed shaft extending through the low speed end casing head and journaled therein in alignment with the high speed shaft, a pinion on the inner end of the high speed shaft, a gear on the inner end of the low speed shaft, a plurality of back gear shafts and gears within the casing lying parallel to the high speed and low speed shafts, gear and pinion connections on said back gear shafts and in conjunction with the high speed shaft pinion and the low speed shaft gear aforesaid, bearing plates seated within the casing end heads, journals in said plates for the back gear shafts aforesaid, whereby the back gear shafts are supported and journaled independently of the casing end heads, and abutments on the inner faces of the casing end heads in alignment with the back gear shafts and serving to limit end movement thereof, substantially as described.

3. A speed change device of the character specified comprising in combination a cylindrical casing having a circular flange at each end, a high speed end casing head seated into the flange at one end, a low speed end casing head seated into the flange at the other end, a high speed shaft extending through the high speed end casing head and journaled therein, a low speed shaft extending through the low speed end casing head and journaled therein in alignment with the high speed shaft, a pinion on the inner end of the high speed shaft, a gear on the inner end of the low speed shaft, a plurality of back gear shafts and gears within the casing lying parallel to the high speed and low speed shafts, gear and pinion connections on said back gear shafts and in conjunction with the high speed shaft pinion and the low speed shaft gear aforesaid, bearing plates seated within the casing end heads, and journals in said plates for the back gear shafts aforesaid, whereby the back gear shafts are supported and journaled independently of the casing end heads, substantially as described.

4. A change speed device of the character described comprising in combination a cylindrical casing, a high speed end casing head seated against the cylindrical casing at one end, a low speed end casing head seated against the casing at the other end, a high speed shaft extending through the high speed end casing head and journaled therein, a low speed shaft extending through the low speed end casing head and journaled therein, in alignment with the high speed shaft, a pinion on the inner end of the high speed shaft, a gear on the inner end of the low speed shaft, a plurality of back gear shafts and gears within the casing lying parallel to the high speed and low speed shafts, gear and pinion connections on said back gear shafts and in conjunction with the high speed shaft pinion and the low speed shaft gear aforesaid, bearing plates in conjunction with the casing end heads, and journals in said plates for the back gear shafts aforesaid, whereby the back gear shafts are supported and journaled independently of the casing end heads, substantially as described.

5. A change speed device of the character described comprising in combination a cylindrical casing, a high speed end casing head seated against the cylindrical casing at one end, a low speed end casing head seated against the casing at the other end, a high speed shaft extending through the high speed end casing head and journaled therein, a low speed shaft extending through the low speed end casing head and journaled therein; a pinion on the inner end of the high speed shaft, a gear on the inner end of the low speed shaft, a plurality of back gear shafts and gears within the casing, gear and pinion connections on said back gear shafts and in conjunction with the high speed shaft pinion and the low speed shaft gear aforesaid, bearing plates in conjunction with the casing end heads, and journals in said plates for the back gear shafts aforesaid, whereby the back gear shafts are supported and journaled independently of the casing end heads, substantially as described.

FREDERICK H. HOGE.